(12) United States Patent
Lee et al.

(10) Patent No.: US 10,407,064 B2
(45) Date of Patent: Sep. 10, 2019

(54) METHOD AND APPARATUS FOR CONTROLLING DRIVING OF SSC-CRUISE SYSTEM

(71) Applicant: Hyundai Motor Company, Seoul (KR)

(72) Inventors: Hyung-Ju Lee, Gyeonggi-do (KR); Kyong-Duck Park, Busan (KR)

(73) Assignee: Hyundai Motor Company, Seoul (KR)

( * ) Notice: Subject to any disclaimer, the term of this patent is extended or adjusted under 35 U.S.C. 154(b) by 320 days.

(21) Appl. No.: 15/360,020

(22) Filed: Nov. 23, 2016

(65) Prior Publication Data
US 2017/0267235 A1 Sep. 21, 2017

(30) Foreign Application Priority Data
Mar. 15, 2016 (KR) .................. 10-2016-0030939

(51) Int. Cl.
| | |
|---|---|
| B60W 10/02 | (2006.01) |
| B60W 10/06 | (2006.01) |
| B60W 30/14 | (2006.01) |
| B60W 30/18 | (2012.01) |
| B60W 50/10 | (2012.01) |

(52) U.S. Cl.
CPC .......... *B60W 30/143* (2013.01); *B60W 10/02* (2013.01); *B60W 10/06* (2013.01); *B60W 30/18018* (2013.01); *B60W 50/10* (2013.01); *B60W 2520/10* (2013.01); *B60W 2540/10* (2013.01); *B60W 2540/12* (2013.01); *B60W 2710/021* (2013.01); *B60W 2710/06* (2013.01); *B60W 2720/10* (2013.01)

(58) Field of Classification Search
CPC ................. B60W 10/02; B60W 10/06; B60W 30/18018; B60W 36/143; B60W 2520/10; B60W 2710/021; B60W 2710/06; B60W 2720/10
See application file for complete search history.

(56) References Cited

U.S. PATENT DOCUMENTS

| | | | | |
|---|---|---|---|---|
| 5,479,349 | A * | 12/1995 | Katayama | ............ B60K 31/047 701/93 |
| 2010/0191435 | A1* | 7/2010 | Okamura | .............. B60W 10/06 701/93 |
| 2012/0078466 | A1* | 3/2012 | Natori | ...................... B60Q 1/52 701/36 |

(Continued)

FOREIGN PATENT DOCUMENTS

| | | |
|---|---|---|
| JP | 2006-256477 A | 9/2006 |
| JP | 2007-187090 A | 7/2007 |

(Continued)

*Primary Examiner* — Edwin A Young
(74) *Attorney, Agent, or Firm* — Mintz Levin Cohn Ferris Glovsky and Popeo, P.C.; Peter F. Corless

(57) ABSTRACT

A method for controlling driving of an SSC-cruise system is provided. The method includes determining whether a cruising function is operated and receiving a target vehicle speed set by the driver and deriving a first offset vehicle speed from the target vehicle speed, when the cruising function is operated. Additionally, the method includes determining whether a second offset vehicle speed is set by the driver and entering the vehicle into SSC in a driving section between the target vehicle speed and the second offset vehicle speed, in response to determining that the second offset vehicle speed is set.

19 Claims, 4 Drawing Sheets

(56) References Cited

U.S. PATENT DOCUMENTS

2013/0131948 A1     5/2013   Iwao et al.
2015/0217768 A1*   8/2015   Fairgrieve ........... B60W 30/143
                                                                       701/93

FOREIGN PATENT DOCUMENTS

| JP | 2007-291919 A | 11/2007 |
| JP | 2008-155815 A | 7/2008 |
| JP | 2009-001245 A | 1/2009 |
| JP | 2012-512785 A | 6/2012 |
| JP | 2013-096518 A | 5/2013 |

* cited by examiner

METHOD AND APPARATUS FOR CONTROLLING DRIVING OF SSC-CRUISE SYSTEM

CROSS-REFERENCE TO RELATED APPLICATIONS

This application claims priority to Korean Patent Application No. 10-2016-0030939, filed on Mar. 15, 2016, which is incorporated herein by reference in its entirety.

BACKGROUND

Field of the Invention

The present invention relates to a method and an apparatus for controlling driving of start/stop coasting (SSC) cruise system, and more particularly, to a method and an apparatus for controlling driving of an SSC-cruise system that enters an SSC in some of a cruising section.

Description of Related Art

Recently, a difference between official fuel efficiency and real fuel efficiency of vehicle driving has been documented. Therefore, the real fuel efficiency upon the vehicle driving requires improvement. As a result, technologies have been researched and developed for maximizing real fuel efficiency using driving conditions of a driver, surrounding traffic conditions, road information, or the like as well as controlling a vehicle system.

For example, a technology of searching and guiding an economy driving route using IT and traffic information, a technology of storing slope information regarding a road and a past driving pattern to guide efficient fuel efficiency driving, a technology of predicting and determining a road gradient and traffic information to control charging/discharging based on a state of charge (SOC) level of a battery, a technology of selectively adjusting a driving mode based on a route toward a destination and traffic information using map information and a database (DB) to minimize fuel consumption, etc., have been researched and developed.

An example of one of the technologies capable of maximizing fuel efficiency as described above may include start/stop coasting (SSC). FIGS. 1A and 1B are diagrams describing the SSC of the related art. Referring to FIGS. 1A and 1B, the SSC is a technology that cuts the fuel to an engine and clutches off a power transfer of a transmission upon coasting (see FIG. 1A). As a result, an engine drag torque is cut off, and thus a driving distance is increased (see FIG. 1B). Further, various types of driver assistance/support system for improving driver convenience have been developed. One example of such a system includes a cruise control system. The cruise control system is a system for driving a vehicle while maintaining a vehicle speed without engagement of an accelerator pedal when the driver fixes the vehicle speed at a desired speed.

Therefore, when the existing vehicle including both the SSC and the cruise control is cruised (e.g., driven/cruised at the desired speed) by the cruise control system, the existing vehicle may not enter the SSC. In other words, since the vehicle needs to be maintained at a constant vehicle speed, the operation of the engine is necessarily required, such that the engine may not stop. As a result, the related art has a problem in that the improvement in fuel efficiency by the entry into the SSC may not be promoted in a cruising section.

SUMMARY

The present invention provides a composite technology of SSC and a cruise control capable of setting a target vehicle speed and an offset vehicle speed upon setting of cruising to enter a vehicle into the SSC when the vehicle reaches the target vehicle speed and release the SSC when the vehicle speed is reduced to the offset vehicle speed.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

An exemplary embodiment of the present invention provides a method for controlling driving of an SSC-cruise system that may include: determining (S100) whether a cruising function (e.g., a cruising function input device such as a button or knob is manipulated or engaged) is operated by a driver; receiving (S200) a target vehicle speed set by the driver and deriving a first offset vehicle speed from the target vehicle speed, when the cruising function is operated; determining (S300) whether the driver sets a second offset vehicle speed, after receiving the target vehicle speed; and entering (S400) the vehicle into SSC in a driving section between the target vehicle speed and the second offset vehicle speed, in response to determining that the second offset vehicle speed is set.

The method may further include: driving (S500) the vehicle at a vehicle speed between the target vehicle speed and the first offset vehicle speed, when the second offset vehicle speed is not set. In the cruising process of driving the vehicle (S500), when a clutch is clutched on while an engine is driven, the vehicle may be operated to maintain a state in which a current vehicle speed reaches the target vehicle speed. In addition, when the current vehicle speed is equal to or less than the first offset vehicle speed, the vehicle may be accelerated to be the target vehicle speed. After the cruising process (S500), the determining of whether a cruising function is operated by a driver may be repeated. In the cruising setting process (S200), the first offset vehicle speed may be a difference value between the target vehicle speed and a preset reference offset.

The process of entering the vehicle into SSC (e.g., SSC cruising process) (S400) may include determining (S410) whether a current vehicle speed is equal to or greater than the target vehicle speed, determining (S420) whether the vehicle satisfies a preset SSC entry condition, in response to determining that the current vehicle speed is equal to or greater than the target vehicle speed, an SSC entering process (S430) of fueling out an engine 400 to stop the engine 400 and release a clutch 500 to allow the vehicle to enter the SSC or maintained in the SSC entry state when the vehicle satisfies the preset SSC entry condition, determining (S440) whether the current vehicle is equal to or less than the second offset vehicle speed, resuming (S450) the supply of fuel to the engine 400 to restart the engine 400 and clutch on the clutch 500 to release the SSC entry condition or maintain the SSC release state when the current vehicle speed is equal to or less than the second offset vehicle speed, and accelerating (S460) the vehicle to increase the current vehicle speed to reach the target vehicle speed.

Additionally, after the cruising process (S500), the determination of whether a cruising function is operated may be repeated. When the current vehicle speed exceeds the second offset vehicle speed, the SSC entering process (S430) may be repeated. In addition, when the vehicle does not satisfy the preset SSC entry condition, the determination of whether a cruising function is operated may be repeated. The preset SSC entry condition may be that an accelerator pedal is disengaged, a brake pedal is disengaged, and the current vehicle speed is equal to or greater than a preset reference vehicle speed. The storage medium according to the present invention may be configured to store the method for controlling driving of an SSC-cruise system which may be executed by a controller having a processor.

Another exemplary embodiment of the present invention provides an apparatus for controlling driving of an SSC-cruise system that may include: a storage medium 100 configured to store a method for controlling driving of an SSC-cruise system; a sensing unit 200 configured to sense a current vehicle speed and whether an accelerator pedal and a brake pedal are operated; a cruising setting unit 300 configured to receive from a driver, a target vehicle speed and a second offset vehicle speed or derive a first offset vehicle speed from the target vehicle speed; and a controller 400 configured to operate a vehicle based on the method for controlling driving of an SSC-cruise system stored in the storage medium 100 using the current vehicle speed and whether the accelerator pedal and the brake pedal are operated detected by the sensing unit 200 and the target vehicle speed, the first offset vehicle speed, and the second offset vehicle speed set by the cruising setting unit 300.

The method may further include: an engine 500 configured to stop or restart by the controller 400 and accelerate the vehicle by the controller 400; and a clutch 600 configured to be clutched on or off by the controller 400. The sensing unit 200 may include: a vehicle speed sensor 210 configured to sense a current vehicle speed; an accelerator pedal position sensor (APS) 220 configured to sense whether an accelerator pedal is operated; and a brake pedal position sensor (BPS) 230 configured to sense whether a brake pedal is operated.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1A:
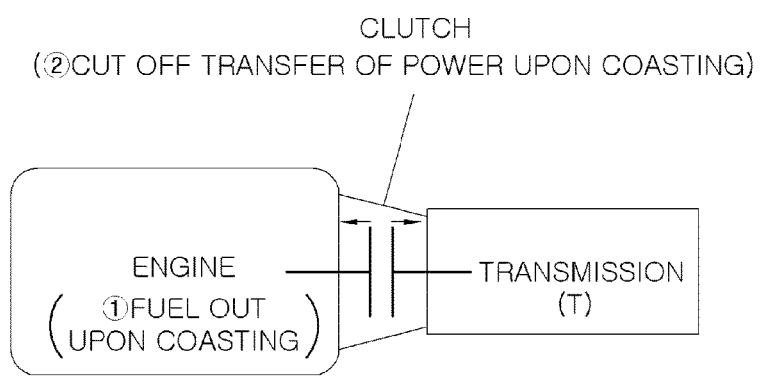
FIGS. 1A and 1B are diagrams describing SSC according to the related art.
Figure 1B:
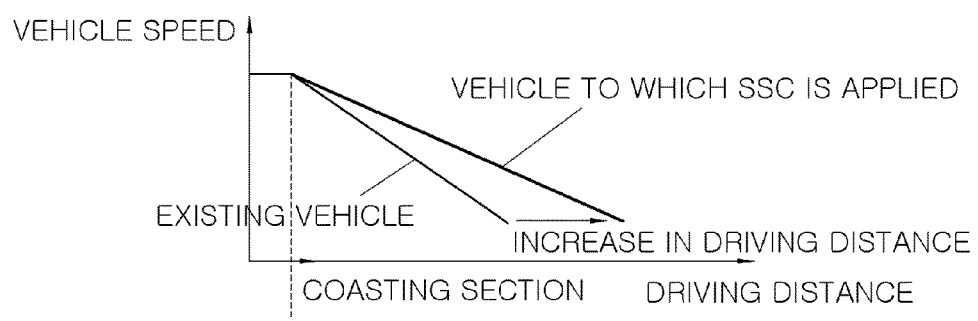

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Terms and words used in the present specification and claims are not to be construed as a general or dictionary meaning but are to be construed meaning and concepts meeting the technical ideas of the present invention based on a principle that the inventors can appropriately define the concepts of terms in order to describe their own inventions in best mode. Therefore, the configurations described in the exemplary embodiments and drawings of the present invention are merely exemplary embodiments but do not represent all of the technical spirit of the present invention. Thus, the present invention should be construed as including all the changes, equivalents, and substitutions included in the spirit and scope of the present invention at the time of filing this application. In the present specification, an overlapped description and a detailed description for well-known functions and configurations that may obscure the gist of the present invention will be omitted. Hereinafter, exemplary embodiments of the present invention will be described in detail with reference to the accompanying drawings.

Figure 2A:
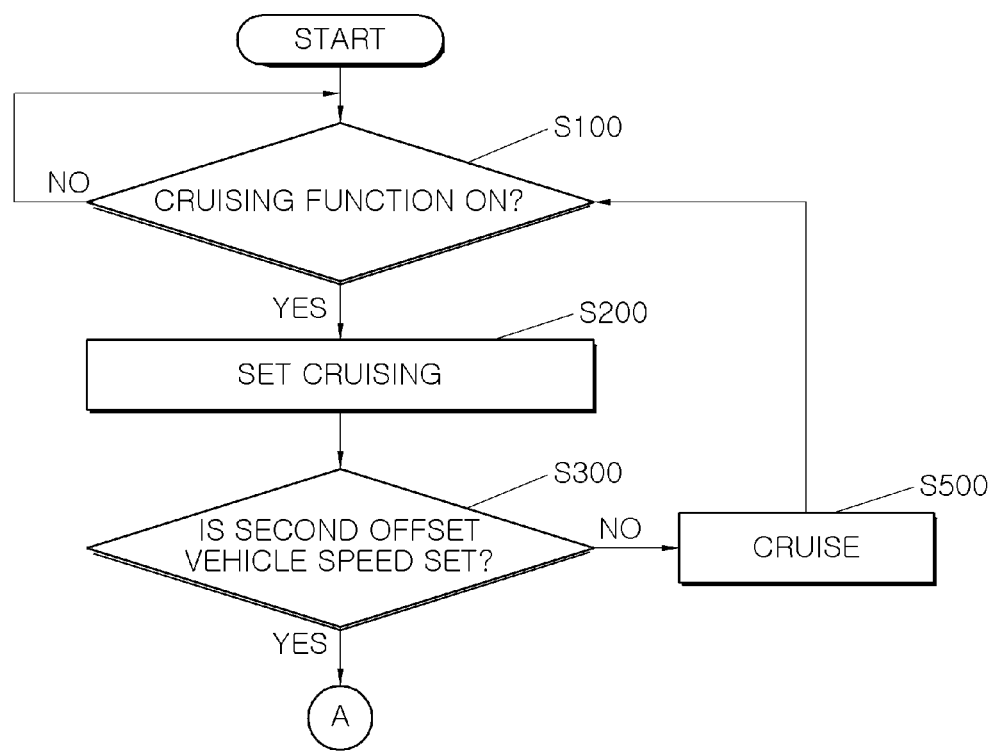
FIGS. 2A and 2B are flow charts of a method for controlling driving of an SSC-cruise system according to an exemplary embodiment of the present invention.
Figure 2B:
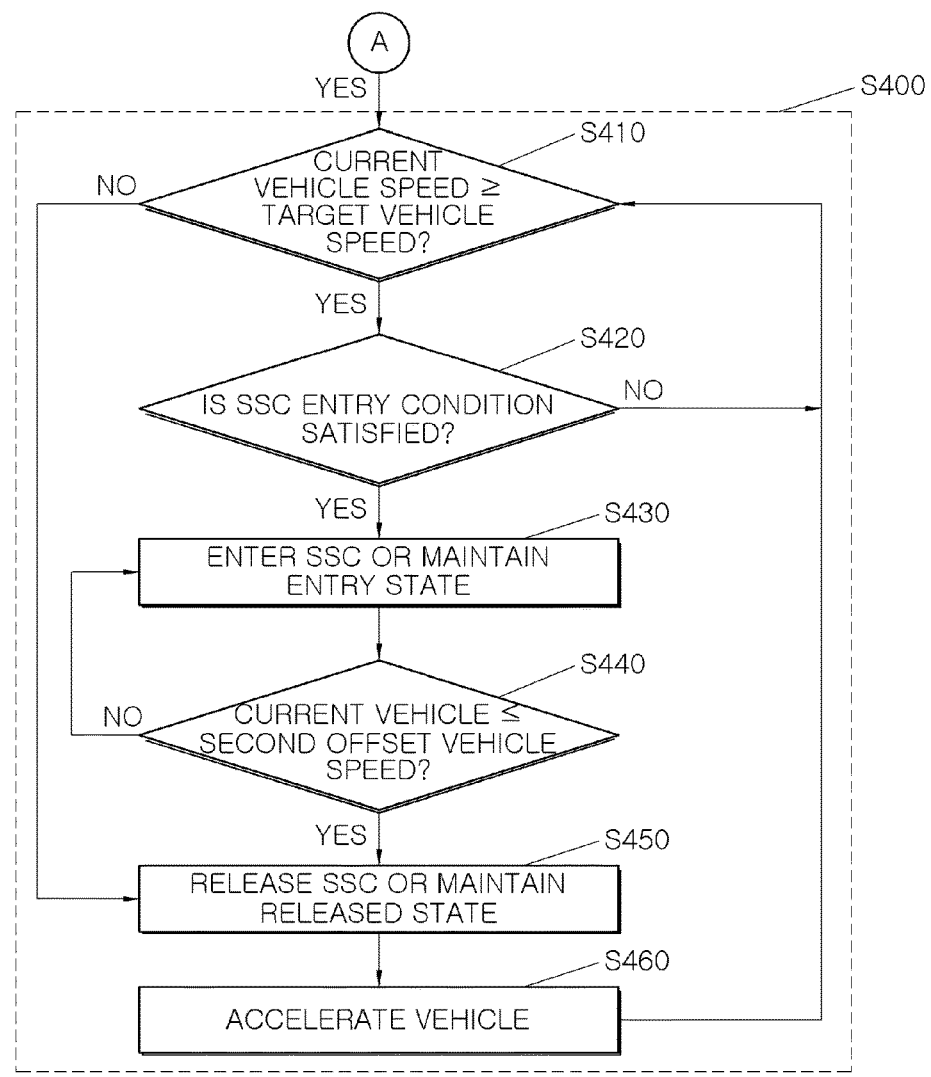

FIG. 2 is a flow chart of a method for controlling driving of an SSC-cruise system according to an exemplary embodiment of the present invention. Referring to FIG. 2, the method for controlling driving of an SSC-cruise system according to an exemplary embodiment of the present invention may include a first determining step (S100), a cruising setting step (S200), a second determining step (S300), an SSC-cruising step (S400), and a cruising driving step (S500). The various steps may be executed by a controller having a processor and a memory.

In the first determining step (S100), the controller may be configured to determine whether a cruising function is operated or manipulated by a driver. The present invention premises that a vehicle includes a cruise system and an SSC system and relates to a control method in the state in which the driver operates the cruising function. In the cruising setting step (S200), when the cruising function is operated, a target vehicle speed may be received at the controller as set by the driver and a first offset vehicle speed may be derived from the target vehicle speed. The target speed may be a vehicle speed constantly maintained by the driver and the first offset vehicle speed may be a low bound value (e.g., a lower limit) of the vehicle speed in the cruising derived from the target vehicle speed.

Particularly, in the cruising setting step (S200), the first offset vehicle speed may be derived as a difference value between the target vehicle speed and a pre-stored reference offset. The pre-stored reference offset which is an allowable deviation from the target vehicle speed may be set differently based on a vehicle type, a designer's intention, or the like. For example, when the driver sets the target vehicle speed to about 100 km/h and the pre-stored reference offset is about 5 km/h, the first offset vehicle speed may be derived as about 95 km/h.

In the second determining step (S300), after the cruising setting step (S200), the controller may be configured to determine whether a second offset vehicle speed is set by the driver. In other words, unlike the first offset vehicle speed derived as soon as the target vehicle speed is set, the second offset vehicle speed may be a value set by the driver's intention. Therefore, setting the second offset vehicle speed by the driver may be detected as an intention to enter SSC-cruising. In particular, the second offset vehicle speed may be the low bound value of the vehicle speed upon the SSC-cruising. For example, as described above, the driver may set the target vehicle speed to be about 100 km/h and may the second offset vehicle speed to be about 80 km/h.

In the SSC-cruising step (S400), in response to determining that the second offset vehicle speed is set, the vehicle may enter the SSC in a driving section between the target vehicle speed and the second offset vehicle speed. In other words, setting the second offset vehicle speed by the driver may indicate an intention to enter the SSC-cruising. Therefore, the vehicle may enter the SSC in the driving section between the target vehicle speed and the second offset vehicle speed, thereby improving the fuel efficiency of the vehicle.

The detailed description of the SSC-cruising step (S400) will be described below.

In the cruising step (S500), in response to determining that the second offset vehicle speed is not set by a driver, the vehicle may be driven at the vehicle speed between the target vehicle speed and the first offset vehicle speed. In other words, the cruising step (S500) may maintain the existing cruising (e.g., the existing cruising speed). In the cruising step (S500), when the clutch is clutched on while the engine is driven, the vehicle may be operated by the controller to maintain the state in which the current vehicle speed reaches the target vehicle speed. For this purpose, in the cruising step (S500), when the current vehicle speed is equal to or less than the first offset vehicle speed, the vehicle may be accelerated until the target vehicle speed is reached.

For example, as described above, when the target vehicle speed is set to be about 100 km/h, the pre-stored reference offset is about 5 km/h, and the first offset vehicle speed may be derived as about 95 km/h, the vehicle may be driven at about 100 km/h. Further, when the current vehicle speed is equal to or less than about 95 km/h, the vehicle may be accelerated to about 100 km/h. After the cruising step (S500), the first determining step (S100) may be repeated. The reason is that the second driver sets the second offset vehicle speed during the cruising to do the SSC-cruising.

Hereinafter, the SSC-cruising step (S400) will be described in detail. The SSC-cruising step (S400) may include a first SSC determining (S410), a second SSC determining step (S420), an SSC entering step (S430), a third SSC determining step (S440), an SSC releasing step (S450), and an accelerating step (S460).

In the first SSC determining step (S410), the controller may be configured to determine that the current vehicle speed is equal to or greater than the target vehicle speed. When the current vehicle speed is less than the target vehicle speed, the cruising may not be performed, and therefore the SSC releasing step (S450) and the accelerating step (S460) may be performed, in which the vehicle speed may be accelerated to be equal to or greater than the target vehicle speed. In the second SCC determining step (S420), when the current vehicle speed is equal to or greater than the target vehicle speed, the controller may be configured to determine that the vehicle satisfies a preset SSC entry condition. The preset SSC entry condition includes that an accelerator pedal is not operated (e.g., is disengaged), a brake pedal is not operated (e.g., is disengaged), and the current vehicle speed is equal to or greater than the preset reference vehicle speed.

In other words, the accelerator pedal and the brake pedal are not operated, and therefore there is no driver's acceleration or deceleration intention. Further, when the current vehicle speed is equal to or greater than the preset reference vehicle speed, the SSC may be sufficiently performed. In particular, the preset reference vehicle speed may be a lowest speed at which the vehicle may perform coasting and may be set differently based on a vehicle type, the designer's intention, or the like. When the vehicle does not satisfy the preset SSC entry condition, the first SCC determining step (S410) may be repeated. In other words, even though the cruising may be performed, the SSC-cruising is not performed under the situation where the SSC entry is difficult.

In the SSC entering step (S430), when the vehicle satisfies the preset SSC entry condition, to allow the vehicle to enter the SSC or be maintained in the SSC entry state, fuel to an engine 400 may cut to stop the engine 400 and a clutch 500 may be clutched off. In other words, in the SSC entering step (S430), fuel to the engine 400 may be cut to stop the engine 400 and the clutch 500 may be disengaged (e.g., clutch off) to cut off the transfer of power to the transmission, thereby initiating the SSC to improve the fuel efficiency of the vehicle.

In the third SSC determining step (S440), after the SSC entering step (S430), the controller may be configured to determine that the current vehicle speed is equal to or less than the second offset vehicle speed. In other words, the vehicle speed may be reduced due to the SSC entry, but the driver operates the cruising function and sets the second offset vehicle speed, and as a result the vehicle needs to enter the SSC in the driving section between the target vehicle speed and the second offset vehicle speed. Therefore, the controller may be configured to determine whether the current vehicle speed is equal to or less than the second offset vehicle speed and in response to determining that the current vehicle speed exceeds the second offset vehicle speed, the SSC entering step (S430) may be repeated to maintain the SSC entry state. In the SSC releasing step (S450), when the current vehicle speed is equal to or less than the second offset vehicle speed, to release the SSC entry state or maintain the SSC release state, the supply of fuel to the engine 400 may be resumed to restart the engine 400 and the clutch 500 may be clutched on (e.g., engaged).

When the current vehicle speed is equal to or less than the second offset vehicle speed, the driver's intention to drive the vehicle at a speed between the target vehicle speed and the second offset vehicle speed may not be met or satisfied. Therefore, the vehicle may be accelerated. Accordingly, to release the SSC entry state or maintain the SSC release state, the supply of fuel to the engine 400 may be resumed to restart the engine 400 and the clutch 400 may be engaged. In the accelerating step (S460), after the SSC releasing step (S450), the vehicle may be accelerated to adjust the current vehicle speed to reach the target vehicle speed. Further, after the accelerating step (S460), the first SSC determining step (S410) may be repeated. In other words, the vehicle may be accelerated to satisfy the driver's intention to enter the SSC while being driven at the speed between the target vehicle speed and the second offset vehicle speed.

Figure 3:
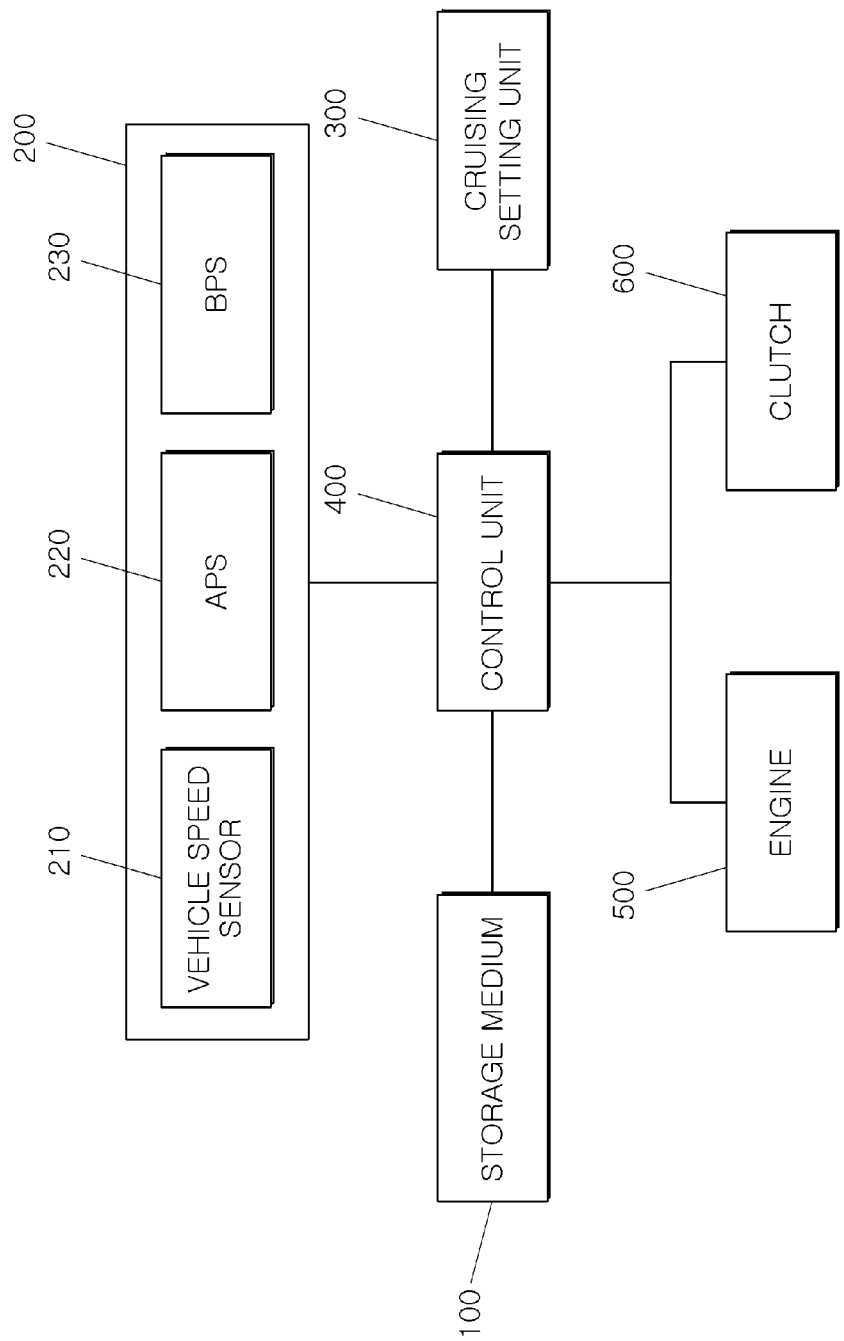
FIG. 3 is a block diagram illustrating an apparatus for controlling driving of an SSC-cruise system according to an exemplary embodiment of the present invention.

FIG. 3 is a block diagram illustrating an apparatus for controlling driving of an SSC-cruise system according to an exemplary embodiment of the present invention. Referring to FIG. 3, the apparatus for controlling driving of an SSC-cruise system according to an exemplary embodiment of the present invention may include a storage medium 100, a sensing unit 200, a cruising setting unit 300, a controller 400, an engine 500, and a clutch 600. The controller 400 may be configured to operate the other units and components of the system.

The storage medium 100 may be configured to store the method for controlling driving of an SSC-cruise system. The sensing unit 200 may include a vehicle speed sensor 210 configured to sense or detect the current vehicle speed and whether the accelerator pedal and the brake pedal are operated (e.g., engaged), an accelerator pedal position sensor (APS) 220 configured to detect the engagement of the accelerator pedal, and a brake pedal position sensor (BPS) 230 configured to detect the engagement of the brake pedal. The cruising setting unit 300 may be configured to receive the target vehicle speed and the second offset vehicle speed as set by a driver or derive the first offset vehicle speed from the target vehicle speed.

The controller 400 may be configured to operate the vehicle based on the method for controlling driving of an SSC-cruise system stored in the storage medium 100 using the current vehicle speed and whether the accelerator pedal and the brake pedal are operated as sensed by the sensing unit 200 and the target vehicle speed, the first offset vehicle speed, and the second offset vehicle speed set by the cruising setting unit 300. The engine 500 may be stopped or restarted by the controller 400 and the controller 400 may further be configured to accelerate the vehicle and engage or disengage the clutch 600.

As described above, according to the exemplary embodiments of the present invention, the vehicle may enter the SSC even in some of the cruising section, thereby promoting the improvement in fuel efficiency.

The foregoing exemplary embodiments are merely examples to allow a person having ordinary skill in the art to which the present invention pertains (hereinafter, referred to as those skilled in the art) to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the invention.

What is claimed is:

1. A method for controlling driving of a start/stop coasting (SSC), cruise system, comprising:
    determining, by a controller, whether a cruising function is operated by a driver;
    receiving, by the controller, a target vehicle speed set by the driver and deriving a first offset vehicle speed from the target vehicle speed, when the cruising function is operated;
    determining, by the controller, whether a second offset vehicle speed is set by the driver; and
    entering, by the controller, the vehicle into SSC-cruising in a driving section between the target vehicle speed and the second offset vehicle speed, in response to determining that the second offset vehicle speed is set.

2. The method of claim 1, further comprising:
    operating, by the controller, the vehicle at a vehicle speed between the target vehicle speed and the first offset vehicle speed when the second offset vehicle speed is not set.

3. The method of claim 2, wherein when a clutch is clutched on while an engine is driven, the vehicle is operated to maintain a state in which a current vehicle speed reaches the target vehicle speed.

4. The method of claim 3, wherein when the current vehicle speed is equal to or less than the first offset vehicle speed, the vehicle is accelerated to be the target vehicle speed.

5. The method of claim 2, wherein after the vehicle is operated at the vehicle speed between the target vehicle speed and the first offset vehicle speed, the determination of whether a cruising function is operated is repeated.

6. The method of claim 1, wherein the first offset vehicle speed is a difference value between the target vehicle speed and a preset reference offset.

7. The method of claim 1, wherein entering the vehicle into the SSC-cruising includes determining, by the controller, whether a current vehicle speed is equal to or greater than the target vehicle speed.

8. The method of claim 7, wherein entering the vehicle into the SSC-cruising step includes determining, by the controller, whether the vehicle satisfies a preset SSC entry condition, in response to determining that the current vehicle speed is equal to or greater than the target vehicle speed.

9. The method of claim 8, wherein entering the vehicle into the SSC-cruising includes stopping, by the controller, the fuel to an engine to stop the engine and releasing a clutch to allow the vehicle to enter the SSC or maintain in the SSC entry state when the vehicle satisfies the preset SSC entry condition.

10. The method of claim 9, wherein entering the vehicle into the SSC-cruising includes determining, by the controller, whether the current vehicle is equal to or less than the second offset vehicle speed.

11. The method of claim 10, wherein entering the vehicle into the SSC-cruising includes resuming, by the controller, the supply of fuel to the engine to restart the engine and engaging the clutch to release the SSC entry state or maintaining the SSC release state when the current vehicle speed is equal to or less than the second offset vehicle speed.

12. The method of claim 11, wherein entering the vehicle into the SSC-cruising includes accelerating, by the controller, the vehicle to adjust the current vehicle speed to reach the target vehicle speed.

13. The method of claim 12, wherein in the entering of the vehicle into SSC-cruising, after the vehicle is accelerated, the determination of whether the current vehicle speed is equal to or greater than the target vehicle speed is repeated.

14. The method of claim 10, wherein in the entering of the vehicle into SSC-cruising, when the current vehicle speed exceeds the second offset vehicle speed, the stopping of the fuel and releasing of the clutch is repeated.

15. The method of claim 8, wherein in the entering of the vehicle into SSC-cruising, when the vehicle does not satisfy the preset SSC entry condition, the determination of whether the current vehicle speed is equal to or greater than the target vehicle speed is repeated.

16. The method of claim 8, wherein the preset SSC entry condition includes an accelerator pedal being disengaged, a brake pedal being disengaged, and the current vehicle speed is equal to or greater than a preset reference vehicle speed.

17. An apparatus for controlling driving of a start/stop coasting (SSC) cruise system, comprising:
 a storage medium configured to store a method for adjusting driving of an SSC-cruise system;
 a sensing unit configured to sense a current vehicle speed and engagement of an accelerator pedal and a brake pedal;
 a cruising setting unit configured to receive a target vehicle speed and a second offset vehicle speed set by a driver or derive a first offset vehicle speed from the target vehicle speed; and
 a controller configured to operate a vehicle based on the method for adjusting driving of an SSC-cruise system stored in the storage medium using the current vehicle speed and whether the accelerator pedal and the brake pedal are engaged and the target vehicle speed, the first offset vehicle speed, and the second offset vehicle speed set by the cruising setting unit.

18. The apparatus of claim 17, further comprising:
 an engine configured to stop or restart by the controller and accelerate the vehicle; and
 a clutch configured to be clutched on or off by the controller.

19. The apparatus of claim 17, wherein the sensing unit includes:
 a vehicle speed sensor configured to sense the current vehicle speed;
 an accelerator pedal position sensor (APS) configured to sense whether the accelerator pedal is engaged; and
 a brake pedal position sensor (BPS) configured to sense whether the brake pedal is engaged.

* * * * *